(12) United States Patent
Zhong et al.

(10) Patent No.: US 10,983,651 B2
(45) Date of Patent: Apr. 20, 2021

(54) TOUCH SUBSTRATE, TOUCH PANEL AND TOUCH DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Tengfei Zhong, Beijing (CN); Xiaodong Xie, Beijing (CN); Min He, Beijing (CN); Lei Zhang, Beijing (CN); Shifeng Xu, Beijing (CN); Xinxiu Zhang, Beijing (CN); Bin Pang, Beijing (CN); Jian Tian, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 17 days.

(21) Appl. No.: 16/504,108

(22) Filed: Jul. 5, 2019

(65) Prior Publication Data

US 2020/0012388 A1 Jan. 9, 2020

(30) Foreign Application Priority Data

Jul. 6, 2018 (CN) .......................... 201810739874.7

(51) Int. Cl.
*G06F 3/044* (2006.01)
(52) U.S. Cl.
CPC .......... *G06F 3/0448* (2019.05); *G06F 3/0445* (2019.05); *G06F 3/0446* (2019.05); *G06F 2203/04112* (2013.01)

(58) Field of Classification Search
CPC .... G06F 3/0448; G06F 3/0445; G06F 3/0446; G06F 2203/04112; G06F 2203/04111; G06F 3/0418; G06F 2203/04103
See application file for complete search history.

(56) References Cited

U.S. PATENT DOCUMENTS

| 8,591,279 | B1* | 11/2013 | Cok | .................... G06F 3/041 445/24 |
|---|---|---|---|---|
| 2009/0219258 | A1* | 9/2009 | Geaghan | ................ G06F 3/044 345/173 |
| 2010/0026664 | A1* | 2/2010 | Geaghan | ................ G06F 3/044 345/174 |
| 2010/0156840 | A1* | 6/2010 | Frey | .................... C23F 1/14 345/174 |
| 2012/0062510 | A1* | 3/2012 | Mo | .................... G06F 3/044 345/174 |
| 2014/0043280 | A1* | 2/2014 | Cok | .................... G06F 3/044 345/174 |
| 2019/0204953 | A1* | 7/2019 | Min | .................... H01L 27/323 |

* cited by examiner

*Primary Examiner* — Benyam Ketema
(74) *Attorney, Agent, or Firm* — McDermott Will & Emery LLP

(57) ABSTRACT

A touch substrate includes a base substrate and a plurality of first touch electrodes and a plurality of second touch electrodes electrically insulated from each other. At least one first touch electrode and at least one second touch electrode each include a mesh structure and a plurality of preset patterns. The mesh structure has a plurality of meshes, at least one of which is provided with at least one preset pattern therein, and at least one of the plurality of preset patterns is electrically insulated from a mesh in which it is located.

10 Claims, 19 Drawing Sheets

TOUCH SUBSTRATE, TOUCH PANEL AND TOUCH DISPLAY DEVICE

CROSS-REFERENCE TO RELATED APPLICATION

This application claims priority to Chinese Patent Application No. 201810739874.7, filed with the Chinese Patent Office on Jul. 6, 2018, titled "TOUCH SUBSTRATE AND METHOD OF MANUFACTURING THE SAME, TOUCH PANEL AND TOUCH DISPLAY DEVICE", which is incorporated herein by reference in its entirety.

TECHNICAL FIELD

The present disclosure relates to the field of touch technologies, and in particular, to a touch substrate, a touch panel and a touch display device.

BACKGROUND

In a touch display device, touch electrodes having metal mesh structures have beneficial performances such as a fast signal transmission speed, and are gradually being accepted and widely used.

SUMMARY

In one aspect, a touch substrate is provided. The touch substrate includes a base substrate, and a plurality of first touch electrodes and a plurality of second touch electrodes disposed on the base substrate. At least one first touch electrode of the plurality of first touch electrodes is strip-shaped and extends in a first direction, at least one second touch electrode of the plurality of second touch electrodes is strip-shaped and extends in a second direction, and the plurality of first touch electrodes are disposed in a different layer from and electrically insulated from the plurality of second touch electrodes. The at least one first touch electrode and the at least one second touch electrode each include a mesh structure and a plurality of preset patterns. The mesh structure includes a plurality of meshes, at least one of which is provided with at least one of the plurality of preset patterns therein, and at least one of the plurality of preset patterns is electrically insulated from a mesh in which it is located. At least one Orthographic projection of the at least one first touch electrode on the base substrate is disposed crosswise to at least one orthographic projection of the at least one second touch electrode on the base substrate to form at least one intersection region. In at least one intersection region, orthographic projections of a mesh structure and a plurality of preset patterns of the first touch electrode on the base substrate and orthographic projections of a mesh structure and a plurality of preset patterns of the second touch electrode on the base substrate form a projected mesh structure having a plurality of projected meshes, and the plurality of projected meshes.

In some embodiments, the plurality of projected meshes have a same shape and size.

In some embodiments, each preset pattern has a same shape as the mesh in which it is located, and a center of the preset pattern coincides with a center of the mesh in which it is located. Sides of the preset pattern are parallel to corresponding sides of the mesh in which it is located, respectively. In at least one intersection region, an orthographic projection of a center of each preset pattern of a corresponding first touch electrode coincides with an orthographic projection of a mesh node of a mesh structure of a corresponding second touch electrode, and an orthographic projection of a center of each preset pattern of the corresponding second touch electrode coincides with an orthographic projection of a mesh node of a mesh structure of the corresponding first touch electrode.

In some embodiments, at least one of the plurality of preset patterns has a shape of a parallelogram or a regular hexagon.

In some embodiments, each preset pattern has a diamond shape.

In some embodiments, each mesh is provided with a single preset pattern therein, and a length of each side of the preset pattern is equal to half of a length of a corresponding side of a mesh in which the preset pattern is located.

In some embodiments, each mesh is provided with N preset patterns having different sizes therein, and N is an integer greater than or equal to two. In a direction that a center of the mesh perpendicularly points to a side of the mesh, the N preset patterns are concentrically arranged in a sequence from small to large, and are a first preset pattern to an Nth preset pattern in turn. In the N preset patterns, a ratio of a length of each side of an i-th preset pattern to a length of a corresponding side in a mesh in which the i-th preset pattern is located is $$\frac{i}{N+1},$$

and i takes any value from one to N.

In some embodiments, the mesh structure and the plurality of preset patterns are made of a same conductive material.

In some embodiments, a material of the mesh structure includes at least one of Cu, Ag, Al, Ti or Ni. A material of the plurality of preset patterns includes at least one of Cu, Ag, Al, Ti, or Ni.

In some embodiments, the plurality of first touch electrodes are a plurality of driving electrodes, and the plurality of second touch electrodes are a plurality of sensing electrodes. Alternatively, the plurality of first touch electrodes are a plurality of sensing electrodes, and the plurality of second touch electrodes are a plurality of driving electrodes.

In another aspect, a touch panel is provided. The touch panel includes the touch substrate described above.

In yet another aspect, a touch display device is provided. The touch display device includes the touch substrate described above.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in embodiments of the present disclosure will be described clearly and completely with reference to the accompanying drawings in embodiments of the present disclosure. Obviously, the described embodiments are merely some but not all of embodiments of the present disclosure. All other embodiments made on the basis of the embodiments of the present disclosure by a person of ordinary skill in the art shall be included in the protection scope of the present disclosure.

Figure 1:
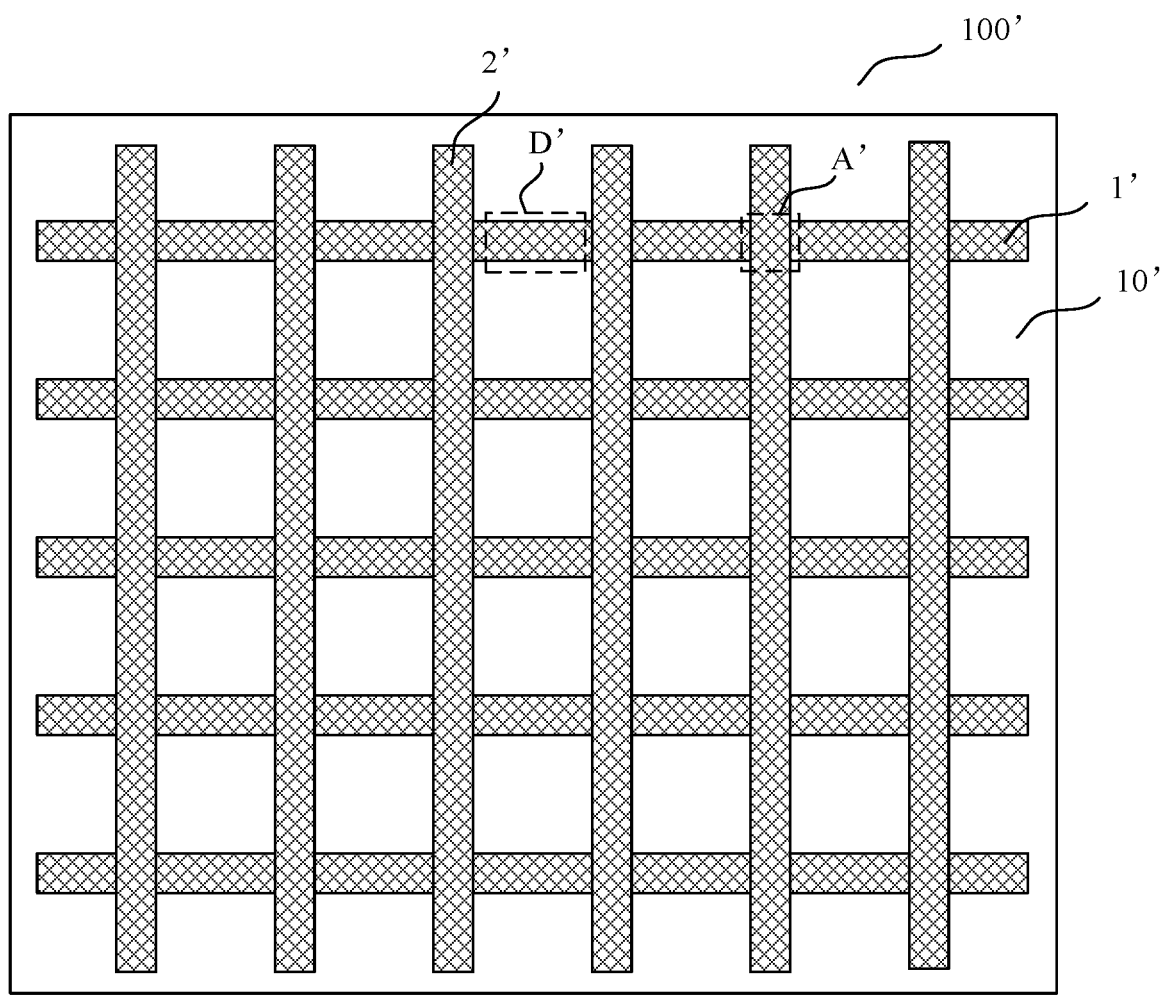
FIG. 1 is a schematic structural diagram of a touch substrate in the related art.

In the related art, as shown in FIG. 1, a touch substrate 100' usually includes a base substrate 10', and first touch electrodes 1' and second touch electrodes 2' disposed on the base substrate 10. The first touch electrodes 1' are electrically insulated from the second touch electrodes 2'.

Figure 2:
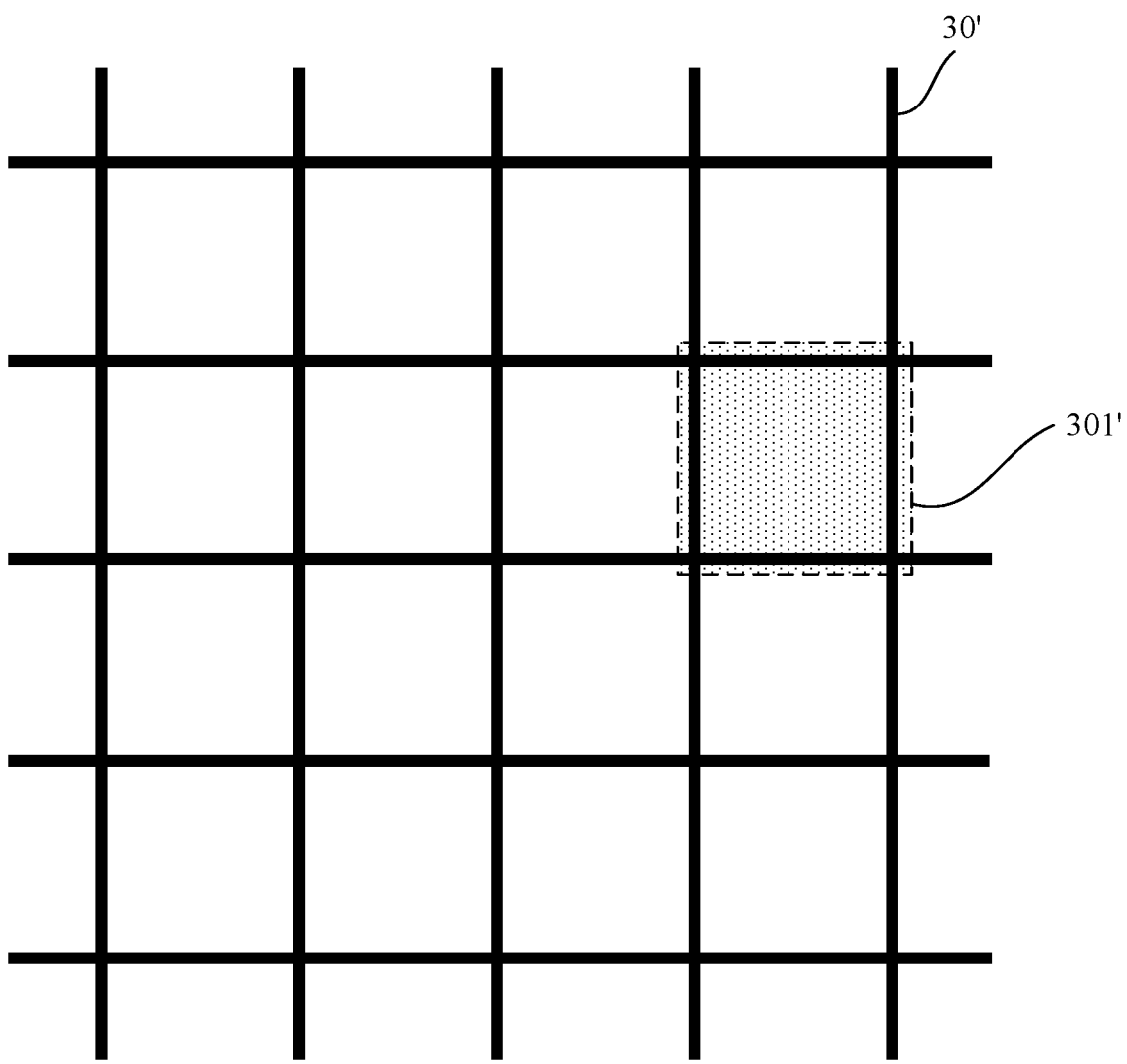
FIG. 2 is a schematic structural diagram of a first touch electrode or a second touch electrode of the touch substrate in the related art.

Referring to FIG. 2, each first touch electrode 1' and each second touch electrode 2' each include metal wires configured to transmit electrical signals. The metal wires intersect to form a mesh structure 30' including a plurality of meshes 301'.

Here, each mesh 301' in the mesh structure 30' of each first touch electrode 1' has a same shape and size as each mesh 301' in the mesh structure 30' of each second touch electrode 2'. Therefore, FIG. 2 may not only shows the mesh structure 30' of each first touch electrode 1', but also shows the mesh structure 30' of each second touch electrode 2'.

Figure 3:
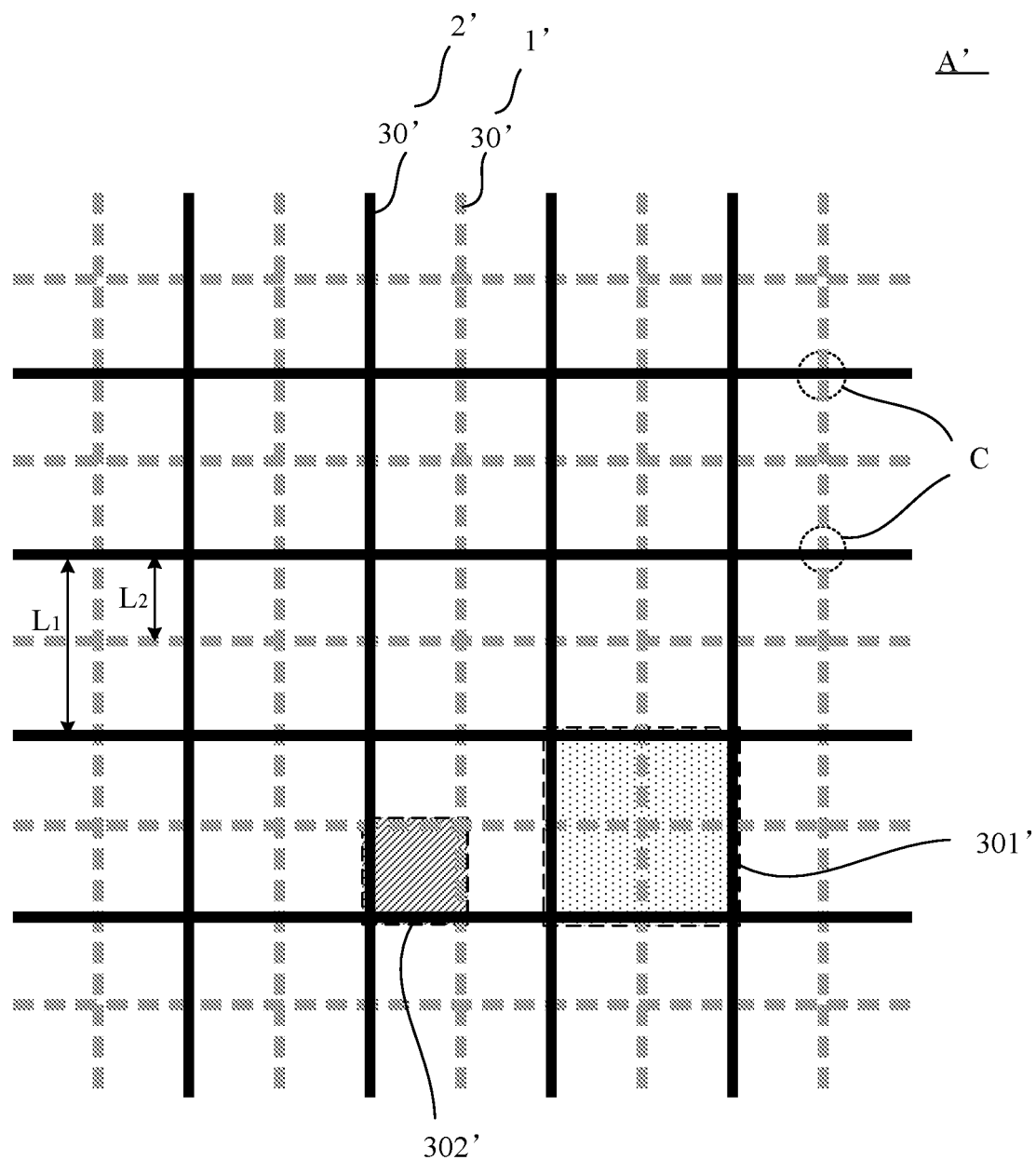
FIG. 3 is a partially enlarged diagram of the region A' of the touch substrate in FIG. 1.

Referring to FIG. 1, orthographic projections of the first touch electrodes 1' on the base substrate 10' and orthographic projections of the second touch electrodes 2' on the base substrate 10' will form intersection regions A', and an enlarged diagram of each intersection region A' is as shown in FIG. 3. As shown in FIG. 3, in the intersection region A', an orthographic projection of a mesh structure 30' of a first touch electrode 1' on the base substrate 10' and an orthographic projection of a mesh structure 30' of a corresponding second touch electrode 2' on the base substrate 10' are staggered. Both of the orthographic projections form a projected mesh structure including a plurality of smaller meshes, and the plurality of smaller meshes that the projected mesh structure includes are referred to as projected meshes 302'. Thus, in each intersection region A', there are a plurality of overlapping regions C in which orthographic projections of wires of the first touch electrode 1' overlap with orthographic projections of wires of the second touch electrode 2'. Since each wire of the first touch electrode 1' and each wire of the second touch electrode 2' are electrically insulated from each other, in each overlapping region C, a mutual inductance capacitor formed by corresponding two wires will be generated.

In addition, a setting density of the wires of each first touch electrode 1' and each second touch electrode 2' is usually large, so that there are a plurality of overlapping regions C in each intersection region A', thereby causing that large mutual inductance capacitances exist between the first touch electrodes 1' and the second touch electrodes 2', and causing a severe resistance capacitance delay of a touch circuit in the touch display device, and reducing a signal transmission speed of the touch display device.

In the related art, by setting the size of each mesh 301' of each first touch electrode 1' and the size of each mesh 301' of each second touch electrodes 2' to be larger, the setting density of the wires of the first touch electrode 1' and the second touch electrode 2' in each intersection region A' is lowered to reduce the number of overlapping regions C and to reduce the mutual inductance capacitance generated. However, in non-overlapping regions other than the intersection regions A', such as the non-overlapping region D' shown in FIG. 1, in a case where the size of each mesh 301' is set to be larger, the human eyes may distinguish the mesh 301'. In this case, the user may notice a presence of the first touch electrodes 1' and the second touch electrodes 2' when using the touch display device, that is, the touch display device has a poor display effect.

Figure 4:
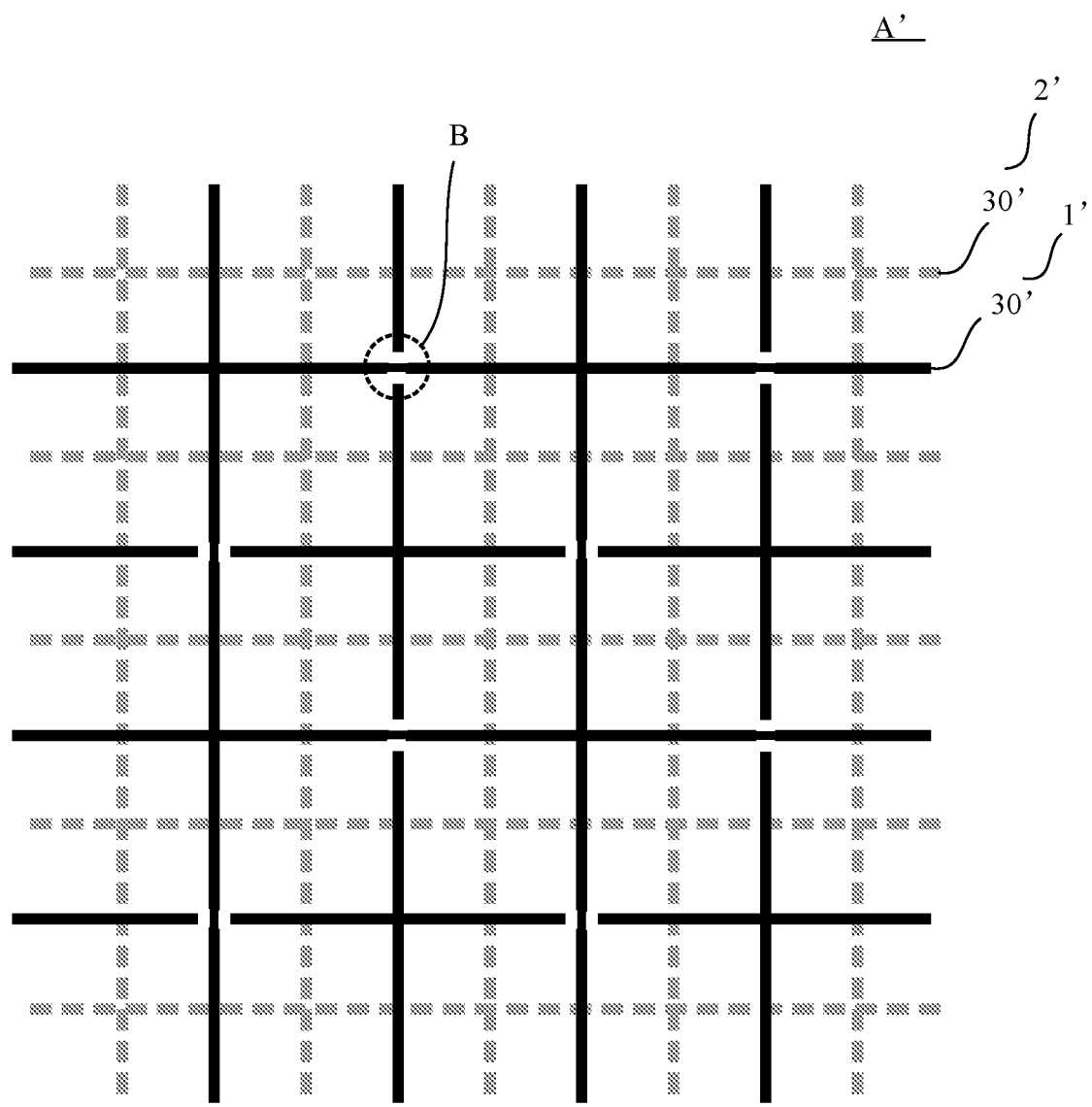
FIG. 4 is another partially enlarged diagram of the region A' of the touch substrate in FIG. 1 in the related art.

In another related art, as shown in FIG. 4, in each intersection region A', some wires in the mesh structure 30' of the first touch electrode 1' or the second touch electrode 2' are cut at mesh nodes to form cut-out regions B, so as to reduce the setting density of the wires for transmitting the electrical signals of the first touch electrode 1' or the second touch electrode 2'. However, since a distance between two adjacent tips of the cut wire in each cut-out region B is relatively close (the distance is usually approximately a dozen micrometers), point discharges are easy to occur at the two tips, thereby easily causing a short circuit between the first touch electrode 1' and the second touch electrode 2', and reducing a touch reliability of the touch display device.

Figure 5:
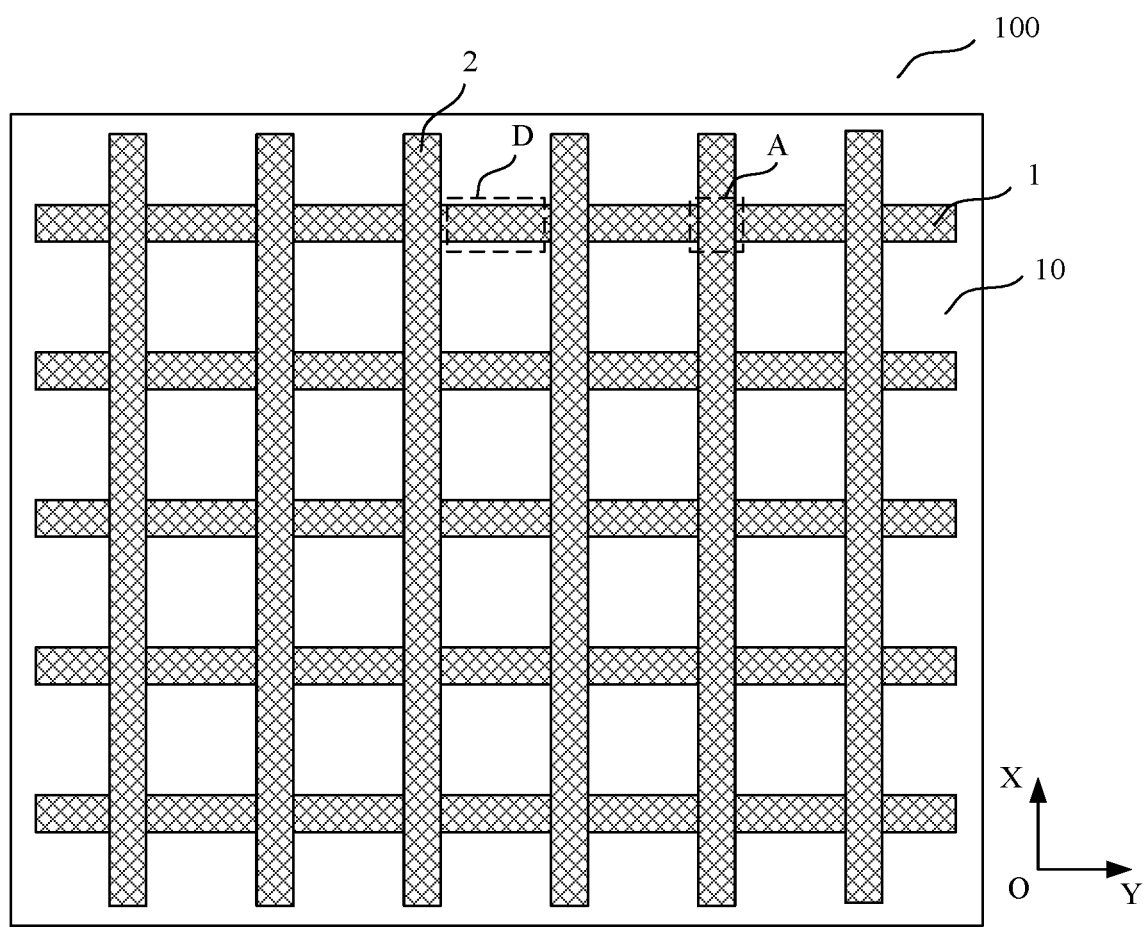
FIG. 5 is a schematic structural diagram of a touch substrate, in accordance with some embodiments of the present disclosure.

Based on this, some embodiments of the present disclosure provide a touch substrate 100. As shown in FIG. 5, the touch substrate 100 includes a base substrate 10, and a plurality of first touch electrodes 1 and a plurality of second touch electrodes 2 disposed on the base substrate 10. At least one first touch electrode 1 is strip-shaped and extends in a first direction OX, and at least one second touch electrode 2 is strip-shaped and extends in a second direction OY. The plurality of first touch electrodes 1 are disposed in a different layer from and electrically insulated from the plurality of second touch electrodes 2.

The first direction OX and the second direction OY intersect with each other. In some examples, the first direction OX is perpendicular to the second direction OY.

Figure 6A:
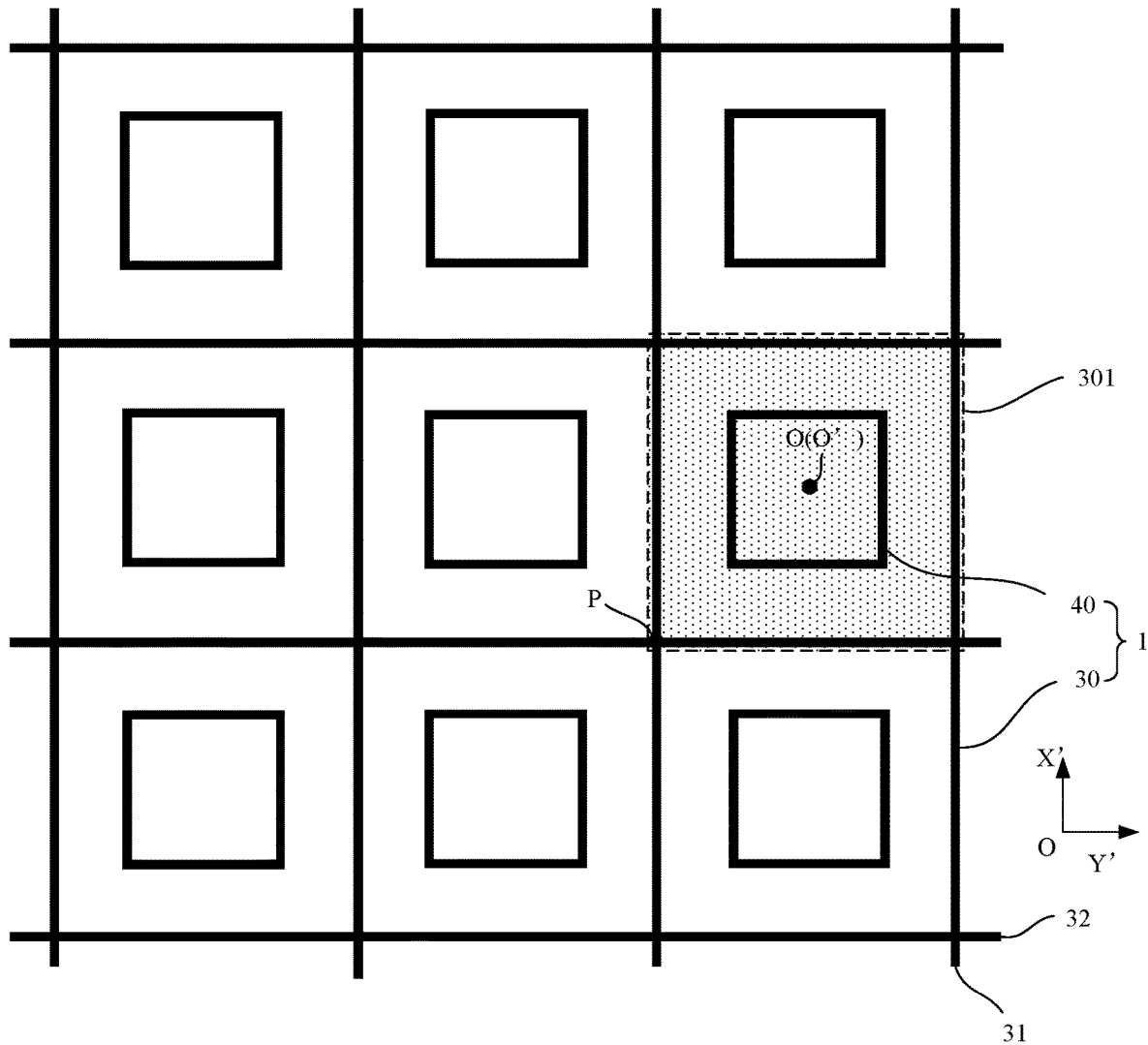
FIG. 6A is a schematic structural diagram of a first touch electrode of a touch substrate, in accordance with some embodiments of the present disclosure.
Figure 6B:
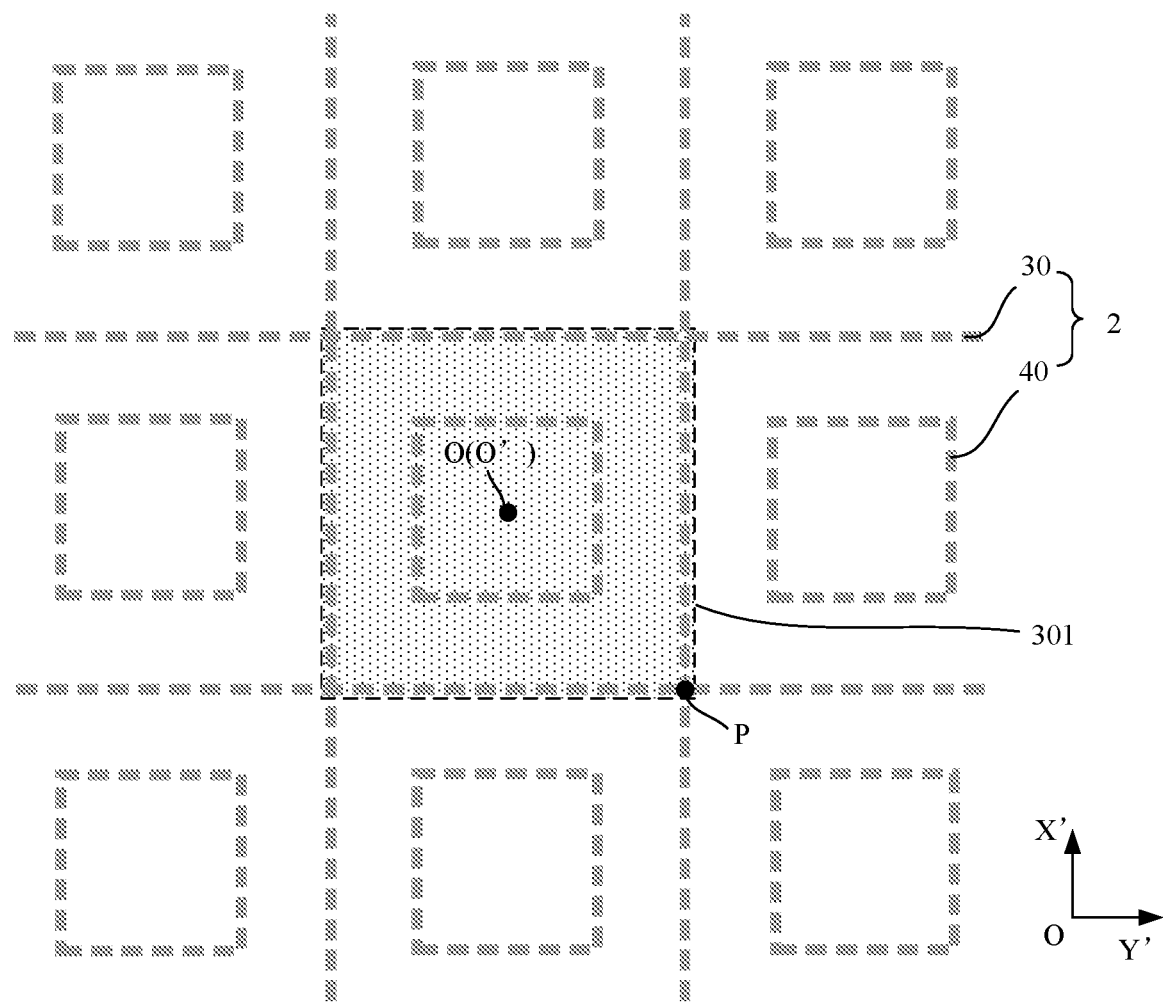
FIG. 6B is a schematic structural diagram of a second touch electrode of a touch substrate, in accordance with some embodiments of the present disclosure.

As shown in FIGS. 6A and 6B, the at least one first touch electrode 1 and the at least one second touch electrode 2 each include a mesh structure 30 and a plurality of preset patterns 40. The mesh structure 30 includes a plurality of meshes 301. A mesh 301 is provided with at least one preset pattern 40 therein, and the at least one preset pattern 40 is electrically insulated from the mesh 301 in which it is located.

Figure 7:
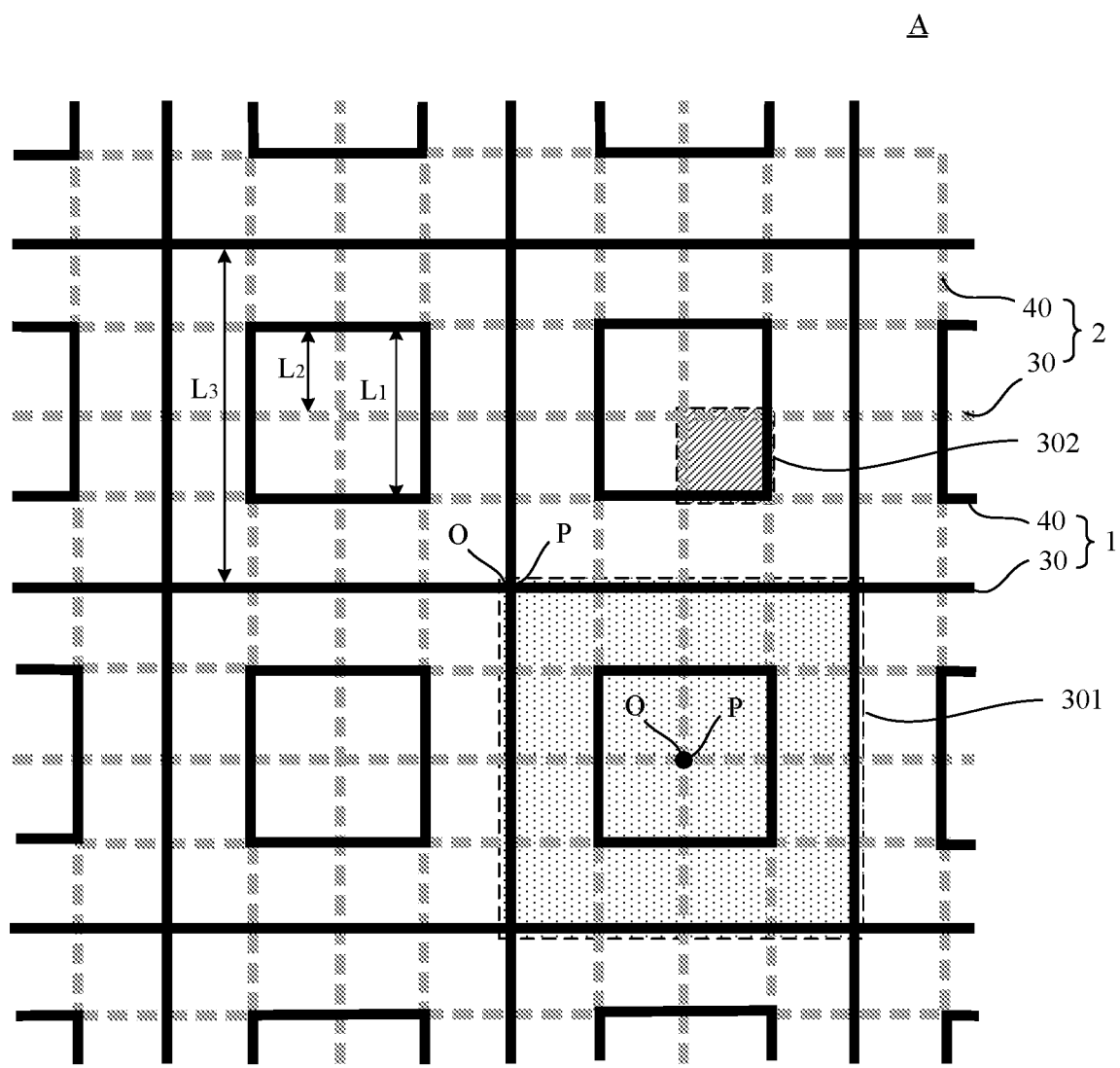
FIG. 7 is a partially enlarged schematic diagram of the region A of the touch substrate in FIG. 5, in accordance with some embodiments of the present disclosure.

FIG. 5 shows first touch electrodes 1 and second touch electrodes disposed crosswise. Orthographic projections of the first touch electrodes 1 on the base substrate 10 are arranged crosswise to orthographic projections of the second touch electrodes 2 on the base substrate 10 to form a plurality of intersection regions A. As shown in FIG. 7, in at least one intersection region A, orthographic projections of a mesh structure 30 and a plurality of preset patterns 40 of the first touch electrode 1 on the base substrate 10 and orthographic projections of a mesh structure 30 and a plurality of preset patterns 40 of the second touch electrode 2 on the base substrate 10 form a projected mesh structure including projected meshes 302.

Referring to FIG. 7, in a case where the size of each projected mesh 302 in the projected mesh structure formed is basically constant, since each preset pattern 40 is electrically insulated from the mesh 301 in which it is located, that is, there is no electrical signal transmission in each preset pattern 40, the setting density of the wires for transmitting the electrical signals in each first touch electrodes 1 and each second touch electrode 2 is low, that is, the mutual inductance capacitances existing between the first touch electrodes and the second touch electrodes are low, thereby improving the resistance capacitance delay of the touch circuit in the touch display device.

Moreover, in non-intersection regions other than the plurality of intersection regions A of the touch substrate 100, for example, in the non-intersection region D shown in FIG. 5, there is only a first touch electrode 1 (see FIG. 6A) or there is only a second touch electrode 2 (see FIG. 6B). Referring to FIGS. 6A and 6B, in each mesh D, the at least one preset pattern 40 disposed in each mesh 301 is smaller in size than the mesh 301. In this case, it may ensure that a size of each preset pattern 40 of the first touch electrode 1 or the second touch electrode 2 in each region D is less than a limit resolution size of human eyes, which may prevent the human eyes from detecting a presence of the plurality of first touch electrodes 1 and the plurality of second touch electrodes 2. Here, the size of each preset pattern 40 refers to a maximum distance between opposite sides of the preset pattern 40. The size of each mesh 301 refers to a maximum distance between opposite sides of the mesh 301.

Therefore, compared with the related art, the size of each mesh 301 of the touch substrate 100 in the embodiments of the present disclosure is larger, which reduces the setting density of the wires for transmitting the electrical signals in each first touch electrode 1 and each second touch electrode 2, but does not make the human eyes detect the presence of the above touch electrodes. That is, the touch substrate 100 improves a signal transmission speed of the touch display device while ensuring a display effect of the touch display device.

In addition, since it is not necessary to provide the plurality of cut-out regions B in the mesh structure 30, it is possible to prevent the point discharges from occurring at the first touch electrodes 1 and the second touch electrodes 2 while reducing the resistance capacitance delay of the touch circuit in the touch display device, which in turn reduces a risk of the short circuit between the first touch electrodes 1 and the second touch electrodes 2, thereby improving the touch reliability of the touch display device.

In some embodiments, the plurality of projected meshes 302 included in the projected mesh structure have a same shape and size. In this way, the plurality of first touch electrodes 1 and the plurality of second touch electrodes 2 of the touch substrate 100 have a good optical uniformity in the plurality of intersection regions A, so that a difference in the display effect at the plurality of intersection regions A is smaller. Therefore, the same shape and size of the plurality of projected meshes 302 are advantageous for improving the display effect of the touch display device.

It will be noted that the description that the plurality of projected meshes 302 included in the projected mesh structure have a same shape means that the plurality of projected meshes 302 are similar figures. The description that the plurality of projected meshes 302 included in the projected mesh structure have a same size means that lengths of corresponding sides of the plurality of projected meshes 302 are the same.

Moreover, since the plurality of projected meshes 302 in the projected mesh structure have the same the shape and size, the plurality of first touch electrodes 1 and the plurality of second touch electrodes 2 of the touch substrate 100 also have a good electrical uniformity in the plurality of intersection regions A. Here, a good electrical uniformity may reduce a difference in touch performance of the touch substrate 100 at the plurality of intersection regions A. Therefore, the same shape and size of the plurality of projected meshes 302 are advantageous for improving the touch performance of the touch display device. In some embodiments, referring to FIGS. 6A and 6B, each preset pattern 40 has a same shape as the mesh 301 in which it is located. A center O of each preset pattern 40 coincides with a center O' of the mesh 301 in which it is located, and respective sides of each preset pattern 40 are parallel to corresponding respective sides of the mesh 301 in which the preset pattern 40 is located, respectively.

Referring to FIG. 7, in the intersection region A, an orthographic projection of a center O of each preset pattern 40 of the first touch electrode 1 coincides with an orthographic projection of a mesh node P of the mesh structure 30 of the second touch electrode 2, and an orthographic projection of a center O of each preset pattern 40 of the second touch electrode 2 coincides with an orthographic projection of a mesh node P of the mesh structure 30 of the first touch electrode 1.

Here, the mesh structure 30 of each first touch electrode 1 and the mesh structure 30 of each second touch electrode 2 each include a plurality of wires disposed crosswise. That is, each of the mesh structure 30 of each first touch electrode 1 and the mesh structure 30 of each second touch electrode 2 is formed by a plurality of wires crosswise. The mesh node P refers to a point of intersection of two wires in the mesh structure 30. For example, as shown in FIG. 6A, a plurality of first wires 31 arranged side by side in the third direction OX' and a plurality of second wires 32 arranged side by side in the fourth direction OY' intersect to form the mesh structure 30 of the first touch electrode 1, and as shown in FIG. 6B, a plurality of first wires 31 arranged side by side in the third direction OX' and a plurality of second wires 32 arranged side by side in the fourth direction OY' intersect to form the mesh structure 30 of the second touch electrode 2. A point of intersection of any first wire 31 and any second wire 32 is the mesh node P of the mesh structure 30.

The third direction OX' and the fourth direction OY' intersect with each other. In some examples, the third direction OX' is perpendicular to the fourth direction OY'.

Figure 8A:
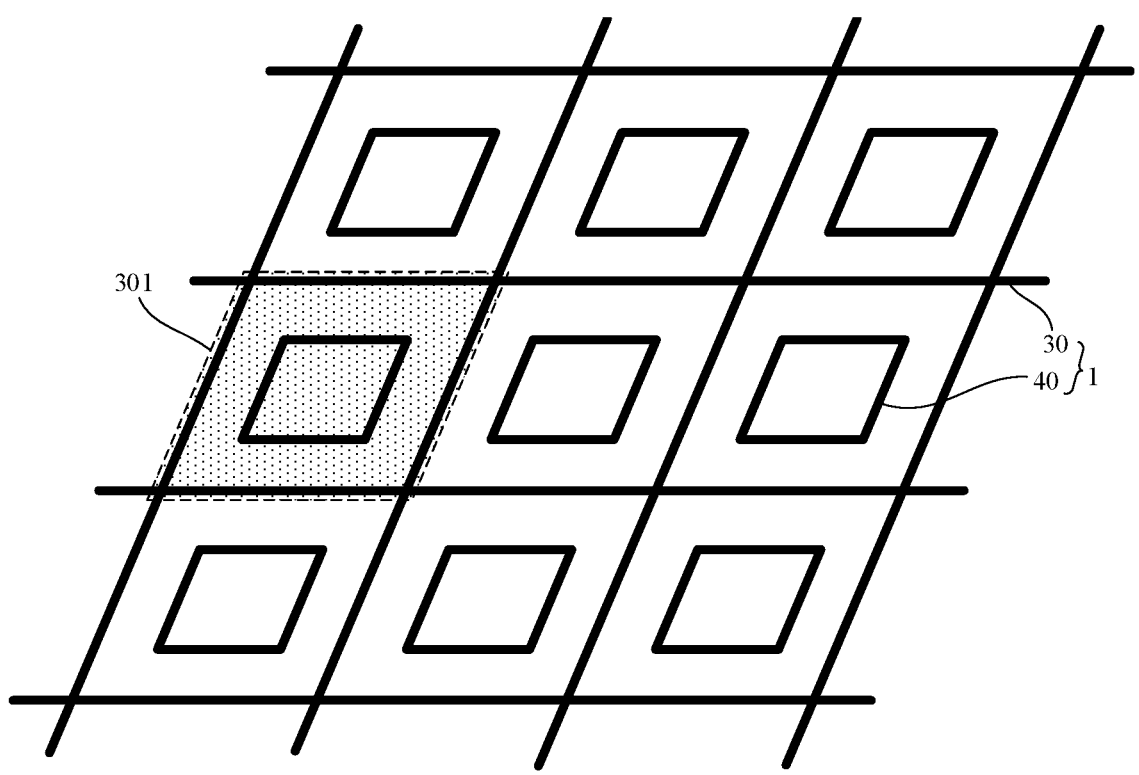
FIG. 8A is a schematic structural diagram of a first touch electrode of another touch substrate, in accordance with some embodiments of the present disclosure.
Figure 8B:
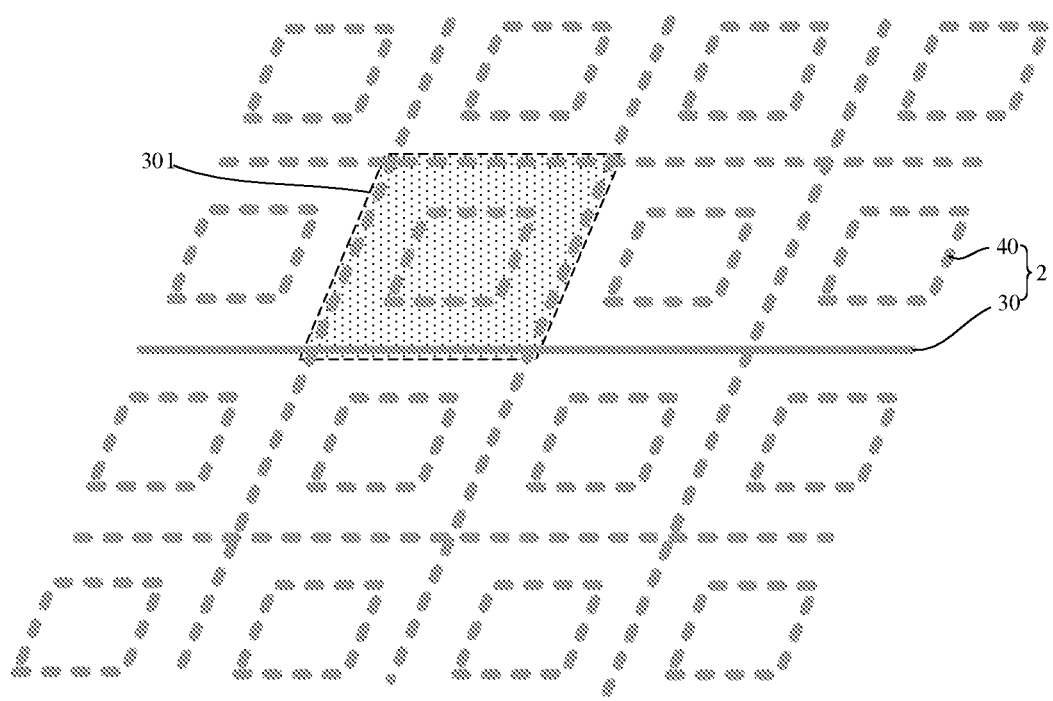
FIG. 8B is a schematic structural diagram of a second touch electrode of another touch substrate, in accordance with some embodiments of the present disclosure.
Figure 9:
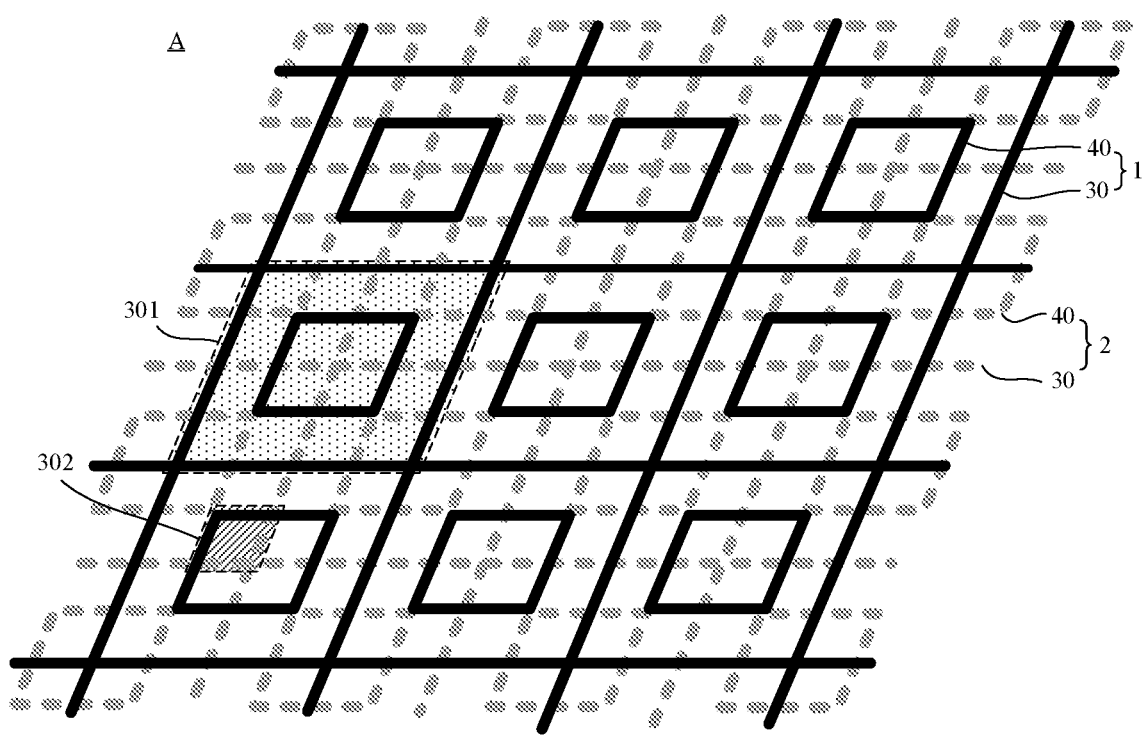
FIG. 9 is a partially enlarged schematic diagram of the region A of another touch substrate in FIG. 5, in accordance with some embodiments of the present disclosure.

In some embodiments, referring to FIGS. 8A and 8B, the preset pattern 40 has a shape of a parallelogram. In this case, referring to FIG. 9, the projected meshes 302 in the projected mesh structure are regularly arranged, which may reduce the moires and weaken an influence of the moires on the display effect of the touch display device.

In the case where the preset pattern 40 has a shape of a parallelogram, for example, referring to FIGS. 6A, 6B and 7, the preset pattern 40 has a rectangular shape. In another example, referring to FIGS. 8A, 8B and 9, the preset pattern 40 has a diamond shape. In the case where each preset pattern 40 has a diamond shape, in the intersection region A, each projected mesh 302 of the projected mesh structure has a similar shape to each preset pattern 40. That is, each projected mesh 302 also has a diamond shape, and lengths of respective sides of the projected mesh 302 are equal. Equal lengths of the respective sides of the projected mesh 302 may further improve the optical uniformity and electrical uniformity of the plurality of first touch electrodes 1 and the plurality of second touch electrodes 2 of the touch substrate 100 in the plurality of intersection regions A.

In addition, angles of each projected mesh 302 may be changed by adjusting a set angle of each preset pattern 40, and the lengths of the sides of each projected mesh 302 may be changed by adjusting set lengths of the sides of each preset pattern 40. In the case where the touch substrate 100 described above is applied to the touch display device, the angles and the lengths of the sides of each preset pattern 40 are adjusted to reduce the influence of the moires on the display effect of the touch display device. For example, a pair of opposite angles of each preset pattern 40 is 60°, and another pair of opposite angles is 120°.

Figure 10A:
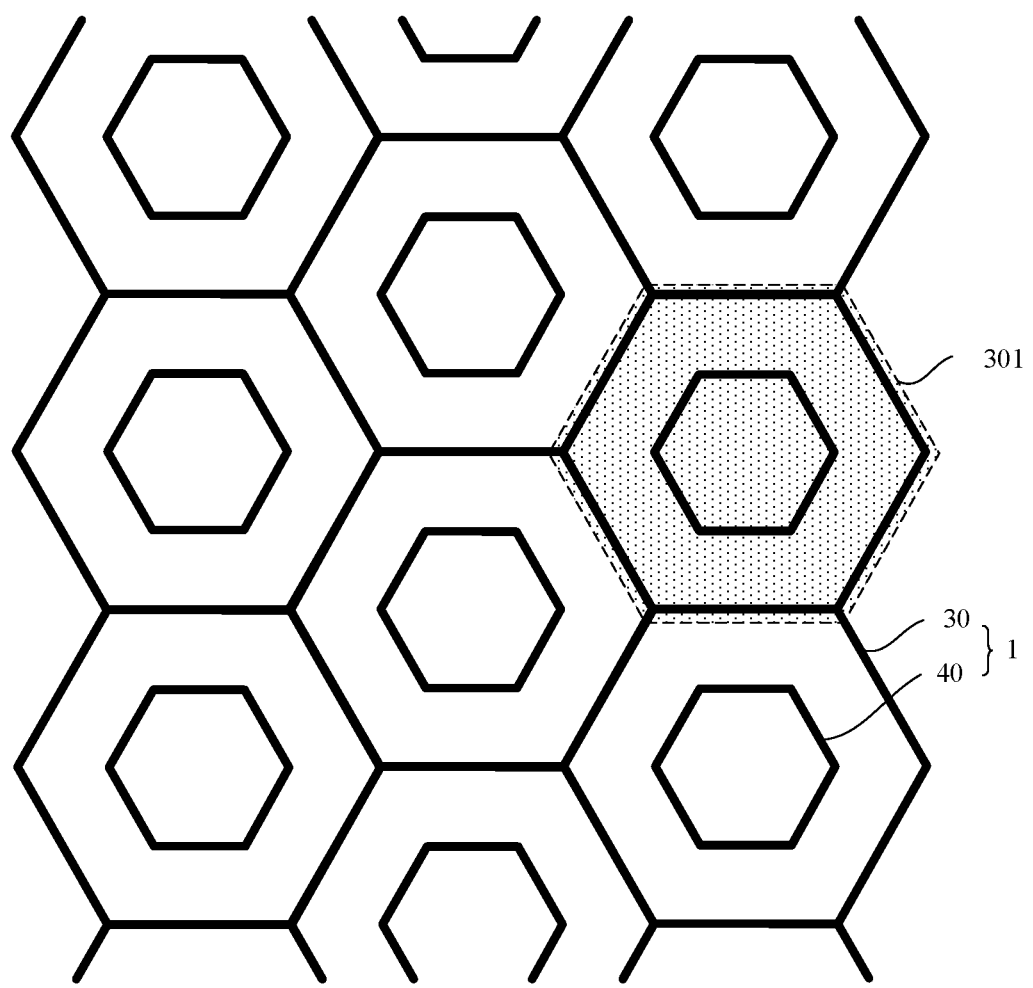
FIG. 10A is a schematic structural diagram of a first touch electrode of yet another touch substrate, in accordance with some embodiments of the present disclosure.
Figure 10B:
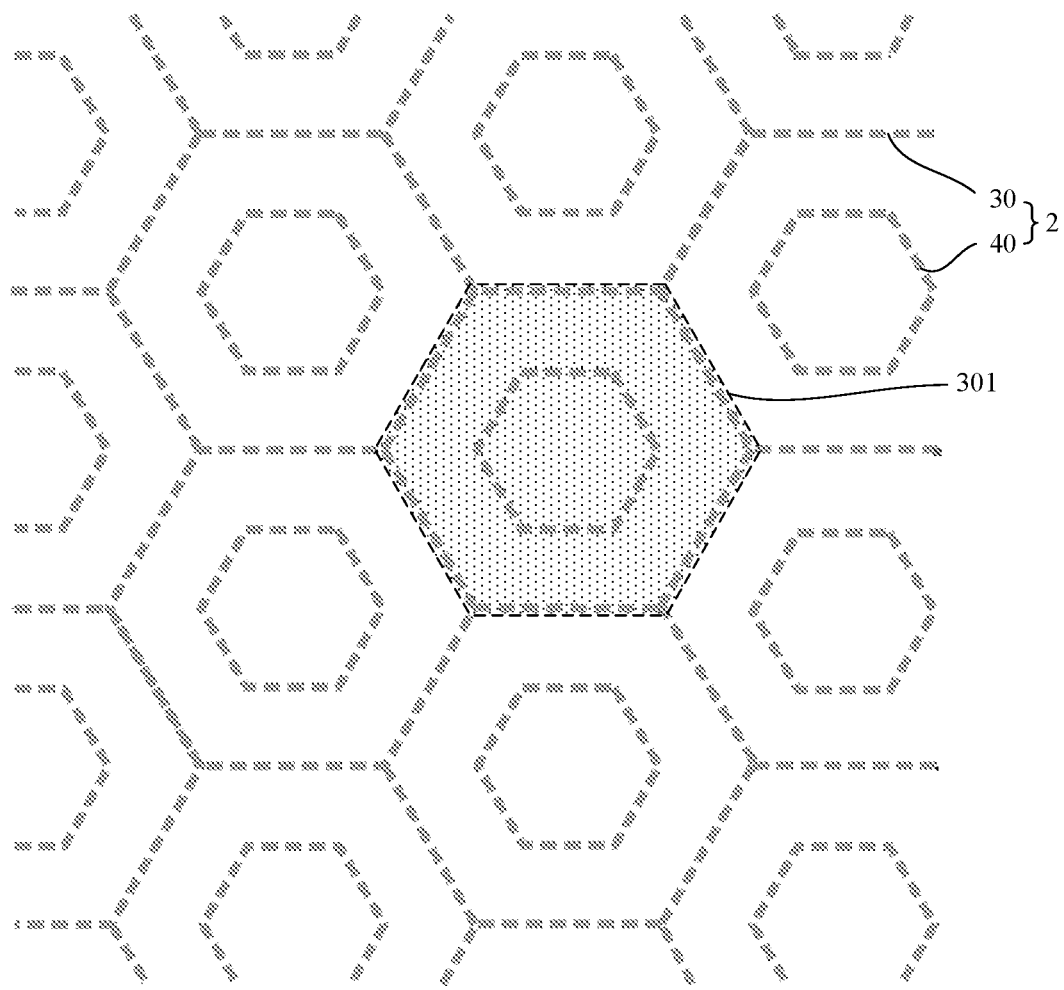
FIG. 10B is a schematic structural diagram of a second touch electrode of yet another touch substrate, in accordance with some embodiments of the present disclosure.
Figure 11:
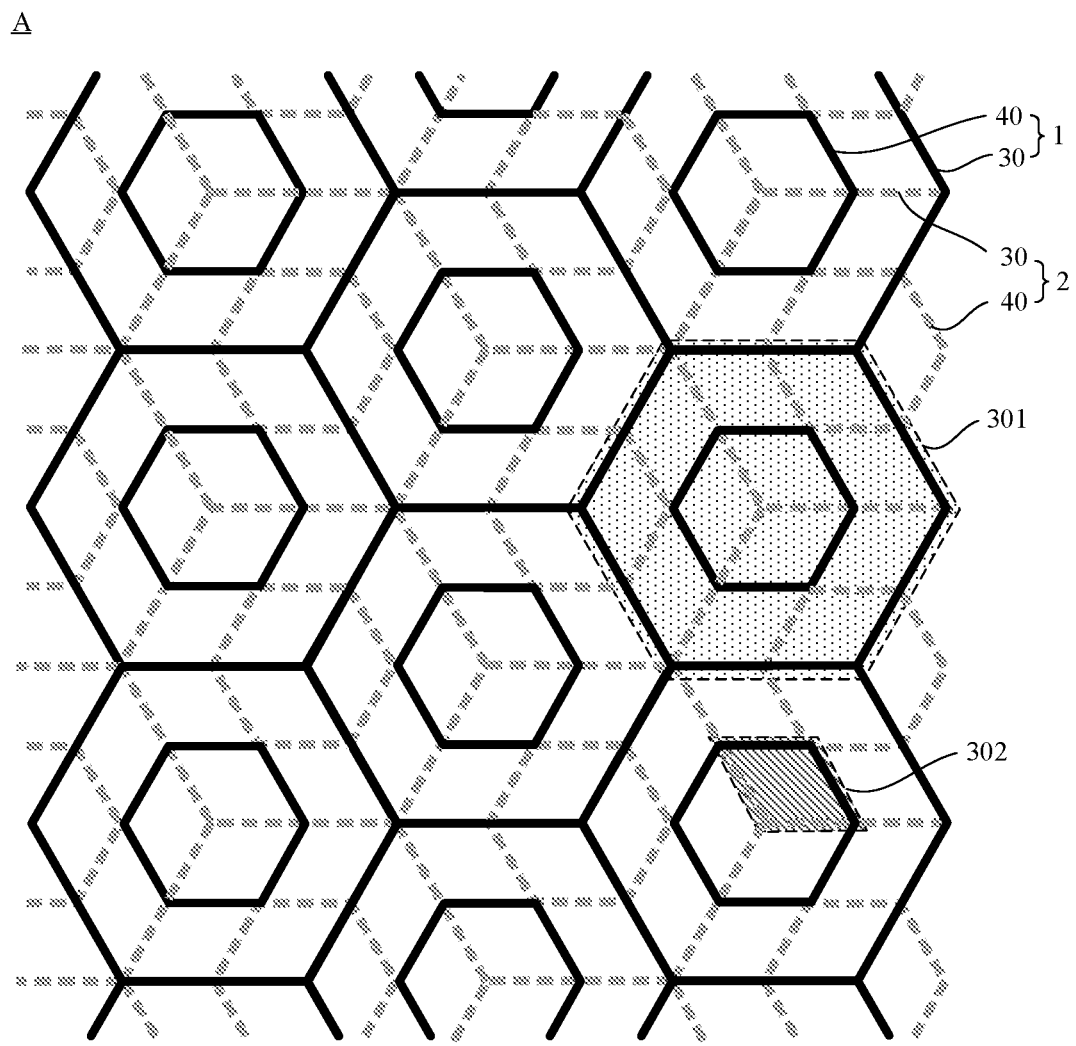
FIG. 11 is a partially enlarged schematic diagram of the region A of yet another touch substrate in FIG. 5, in accordance with some embodiments of the present disclosure.

In some other embodiments, referring to FIGS. 10A, 10B and 11, the preset pattern 40 has a shape of a regular hexagon. In this case, the plurality of projected meshes 302 of the projected mesh structure have the same shape and size. Therefore, the touch substrate 100 has a good optical uniformity and a good electrical uniformity in the plurality of intersection regions A.

The number of the at least one preset pattern 40 disposed in the mesh 301 is not limited.

For example, the number of the at least one preset pattern 40 disposed in the mesh 301 is set according to an area of the intersection region A. For example, in a case where the area of the intersection region A is larger, the setting density of the wires for transmitting the signals is reduced by increasing the number of the preset patterns 40 disposed in the mesh 301, which may reduce the number of the mutual inductance capacitances existing between the plurality of wires of the first touch electrode 1 and the plurality of wires of the second touch electrode 2 in the intersection region A, thereby reducing the resistance capacitance delay of the touch circuit in the touch display device.

In some examples, referring to FIG. 6A, FIG. 6B and FIG. 7, the mesh 301 is provided with a single preset pattern 40 therein, and a length of each side of the preset pattern 40 is equal to half of a length of a corresponding side of the mesh 301 in which the preset pattern 40 is located.

Figure 12A:
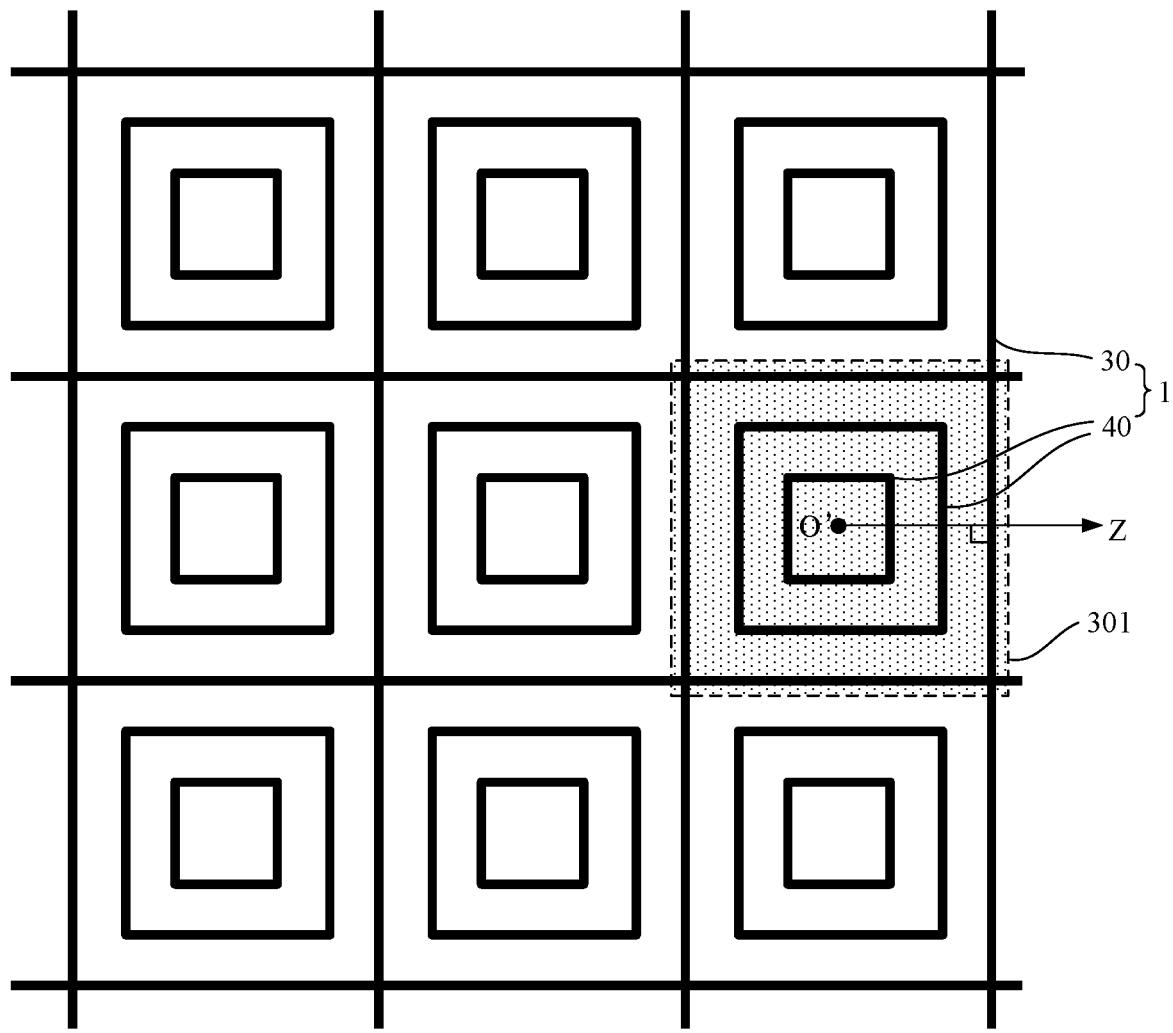
FIG. 12A is a schematic structural diagram of a first touch electrode of yet another touch substrate, in accordance with some embodiments of the present disclosure.
Figure 12B:
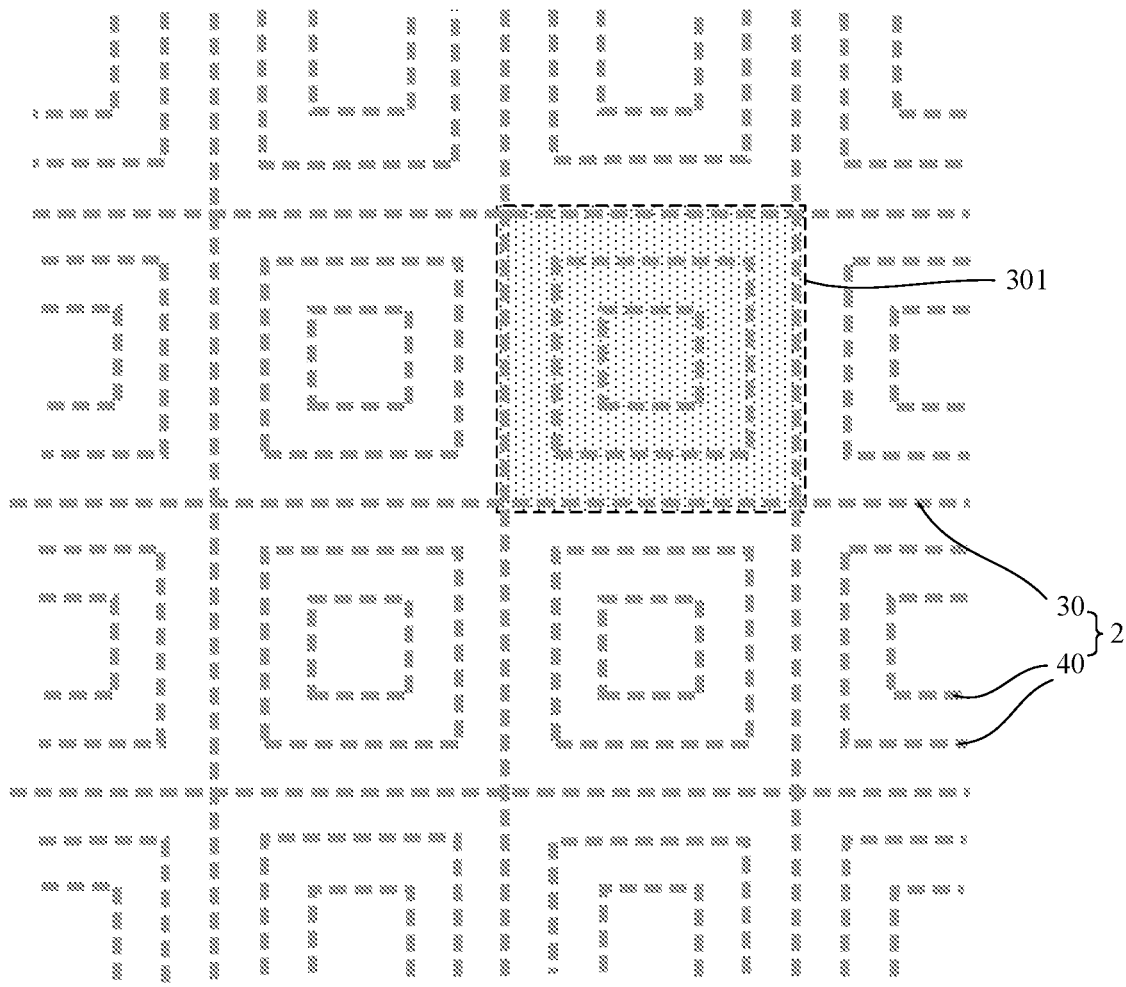
FIG. 12B is a schematic structural diagram of a second touch electrode of yet another touch substrate, in accordance with some embodiments of the present disclosure.
Figure 13:
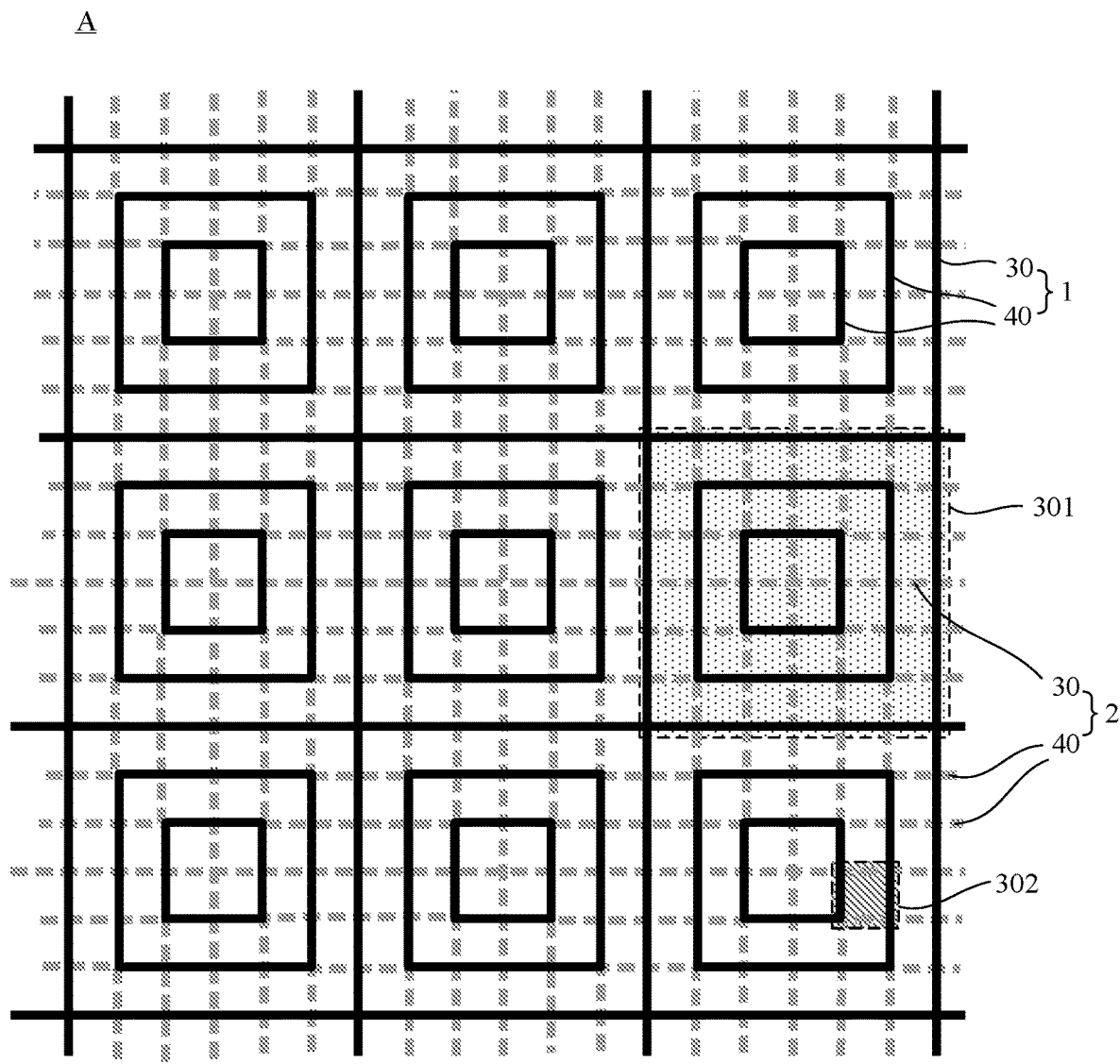
FIG. 13 is a partially enlarged schematic diagram of the region A of yet another touch substrate in FIG. 5, in accordance with some embodiments of the present disclosure.

In some examples, referring to FIG. 12A, FIG. 12B and FIG. 13, the mesh 301 is provided with N preset patterns 40 having different sizes therein, and N is an integer greater than or equal to two. In a direction O'Z that a center O' of the mesh 301 perpendicularly points to a side of the mesh, the N preset patterns 40 are concentrically arranged in a sequence from small to large, and are a first preset pattern 40 to an Nth preset pattern 40 in turn. In the N preset patterns 40, a ratio of a length of each side of an i-th preset pattern 40 to a length of a corresponding side of the mesh 301 in which the i-th preset pattern 40 is located is $$\frac{i}{N+1},$$

and i takes any value from one to N.

Here, in each intersection region A, in a case where the lengths of the sides of each projected mesh 302 of the projected mesh structure are constant, the more the number of the preset patterns 40 disposed in each mesh 301, the smaller the setting density of the wires for transmitting the signals of the first touch electrode 1 and the second touch electrode 2, and the smaller the mutual inductance capacitance existing between the first touch electrode and the second touch electrode, which may further reduce the resistance capacitance delay of the touch circuit and improve the signal transmission speed of the touch display device.

Referring to FIGS. 1 and 3, each mesh 301' and each projected mesh 302' of the touch substrate 100' each have a square shape in the related art. In a case where a minimum side length of each mesh 301' is set to be $L_1$, it is possible to prevent the human eyes from detecting the presence of the plurality of first touch electrodes 1' and the plurality of second touch electrodes 2'. In this case, a side length of each projected mesh 302' is $L_2$.

In some embodiments of the present disclosure, referring to FIG. 7, each mesh 301 and each projected mesh 302 of the touch substrate 100 each have a square shape, and each mesh 301 is provided with a single preset pattern 40 therein. In a case where a side length of each preset pattern 40 is set to be $L_1$, it is possible to prevent the human eyes from detecting the presence of the plurality of first touch electrodes 1 and the plurality of second touch electrodes 2. In this case, a side length of each projected mesh 302 is $L_2$. In each intersection region A, a side length of each mesh 301 is $L_3$, and $L_3$ is a product of two and $L_1$. That is, the side length of each mesh 301 is greater than the side length of each mesh 301' in the above related art. Therefore, in the embodiments of the present disclosure, the setting density of the wires for transmitting the electrical signals of the touch substrate 100 in each intersection region A is lower.

For example, if the side length $L_1$ of each preset pattern 40 is 400 μm, the side length $L_3$ of each mesh 301 is 800 μm, and the side length $L_2$ of each projected mesh 302 is 200 μm.

In some embodiments, the mesh structure 30 and the plurality of preset patterns 40 are made of a same conductive material.

In this way, when the plurality of first touch electrodes 1 or the plurality of second touch electrodes 2 are manufactured, the mesh structure 30 and the preset patterns 40 may be formed in a same process, which simplifies manufacturing processes of the touch substrate 100.

For example, the material of the mesh structure 30 includes at least one of Cu, Ag, Al, Ti or Ni. The material of the plurality of preset patterns 40 includes at least one of Cu, Ag, Al, Ti, or Ni.

In some embodiments, the plurality of first touch electrodes 1 are a plurality of driving electrodes, and the plurality of second touch electrodes 2 are a plurality of sensing electrodes. In some other embodiments, the plurality of first touch electrodes 1 are a plurality of sensing electrodes, and the plurality of second touch electrodes 2 are a plurality of driving electrodes.

Figure 14:
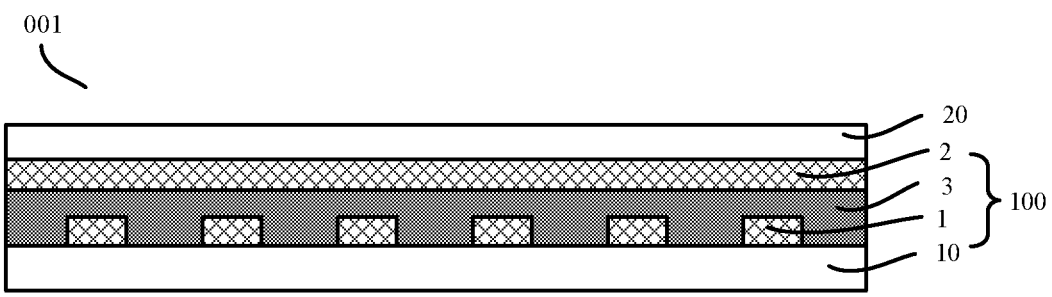
FIG. 14 is a schematic structural diagram of a touch panel, in accordance with some embodiments of the present disclosure.

Some embodiments of the present disclosure provide a touch panel 001. Referring to FIG. 14, the touch panel 001 includes the touch substrate 100 described above. The touch substrate 100 includes the base substrate 10, the first touch electrodes 1 and the second touch electrodes 2 disposed on the base substrate 10, and an insulating layer 3 disposed between the first touch electrodes 1 and the second touch electrodes 2.

The touch panel 001 also has an advantage of improving the signal transmission speed of the touch display device while ensuring the display effect of the touch display device.

In some embodiments, referring to FIG. 14, the touch panel 001 further includes a protective layer 20 disposed on a side of second touch electrodes 2 away from the base substrate 10.

Figure 15:
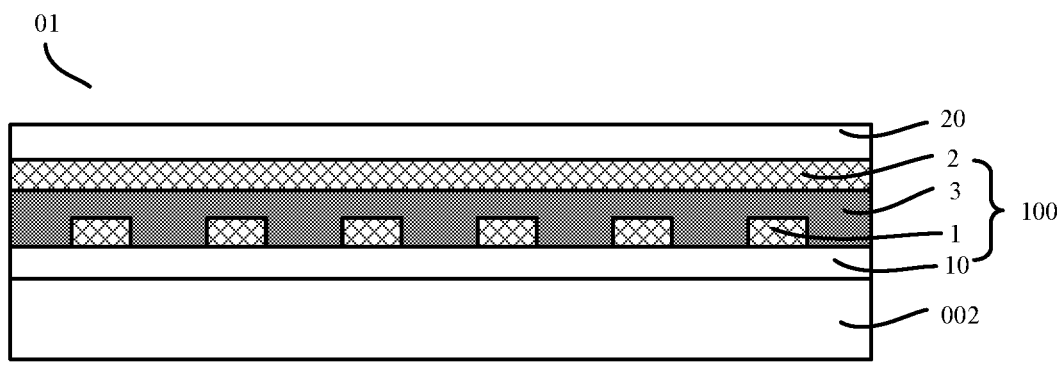
FIG. 15 is a schematic structural diagram of a touch display device, in accordance with some embodiments of the present disclosure.

Some embodiments of the present disclosure provide a touch display device 01. Referring to FIG. 15, the touch display device 01 includes the touch substrate 100 described above. The touch substrate 100 includes the base substrate 10, the first touch electrodes 1 and the second touch electrodes 2 disposed on the base substrate 10, and an insulating layer 3 disposed between the first touch electrodes 1 and the second touch electrodes 2.

The touch display device 01 also has the advantage of improving the signal transmission speed of the touch display device while ensuring the display effect.

For example, the touch display device 01 provided by the embodiments of the present disclosure is an on cell touch display device, an in cell touch display device, or a one glass solution (OGS) touch display device.

For example, as shown in FIG. 15, the touch device 01 further includes a display panel 002 disposed on a side of the base substrate 10 away from the first touch electrodes 1 and a protective layer 20 disposed on a side of the second touch electrodes away from the base substrate 10. Here, the touch display device 01 is an on cell touch display device.

In some embodiments, the touch display device 01 is a liquid crystal display (abbreviated as LCD) device. In this case, the LCD device further includes a liquid crystal display panel and a backlight module. The liquid crystal display panel includes an array substrate, an opposite substrate and a liquid crystal layer disposed between the array substrate and the opposite substrate. The backlight module includes a backlight source, a diffusion plate and a light guide plate. For example, the touch substrate 100 is disposed at a side of the display panel where the display surface of the display panel is disposed.

In some embodiments, the touch display device 01 is an organic light-emitting diode (abbreviated as OLED) display device. In this case, the OLED display device further includes an organic light-emitting diode display panel. The organic light-emitting diode display panel includes cathodes, anodes and light-emitting layers each disposed between a corresponding cathode and a corresponding anode. For example, the touch substrate 100 is disposed at a side of the organic light-emitting diode display panel where the display surface of the display panel is located.

For example, the touch display device 01 is any device that displays an image whether moving (for example, a video) or fixed (for example, a still image), and whether literal or graphical. More specifically, it is contemplated that the described embodiments may be implemented in or associated with a variety of electronic devices. The variety of electronic devices may include (but not limit to), for example, mobile telephones, wireless devices, portable android devices (PAD), hand-held or portable computers, global positioning system (GPS) receivers/navigators, cameras, MPEG-4 Part 14 (MP4) video players, a vidicon, game consoles, watches, clocks, calculators, TV monitors, flat panel displays, computer monitors, car displays (e.g., odometer displays), navigators, cockpit controllers and/or displays, camera view displays (e.g., rear view camera display in a vehicle), electronic photos, electronic billboards or signages, projectors, building structures, packaging and aesthetic structures (e.g. a display for an image of a piece of jewelry).

Figure 16:
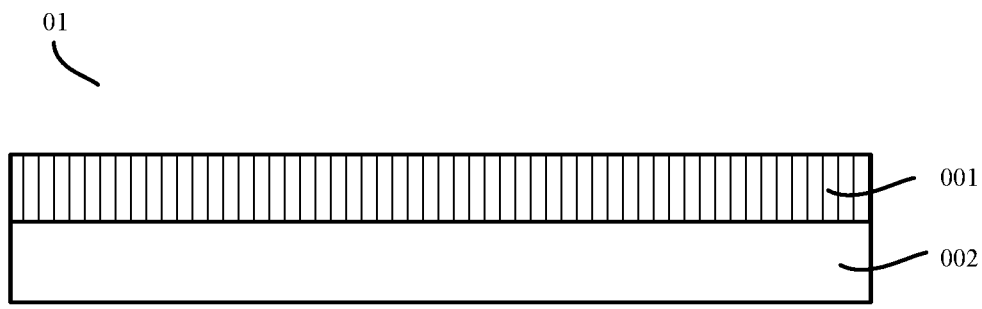
FIG. 16 is a schematic structural diagram of another touch display device, in accordance with some embodiments of the present disclosure.
Figure 17:
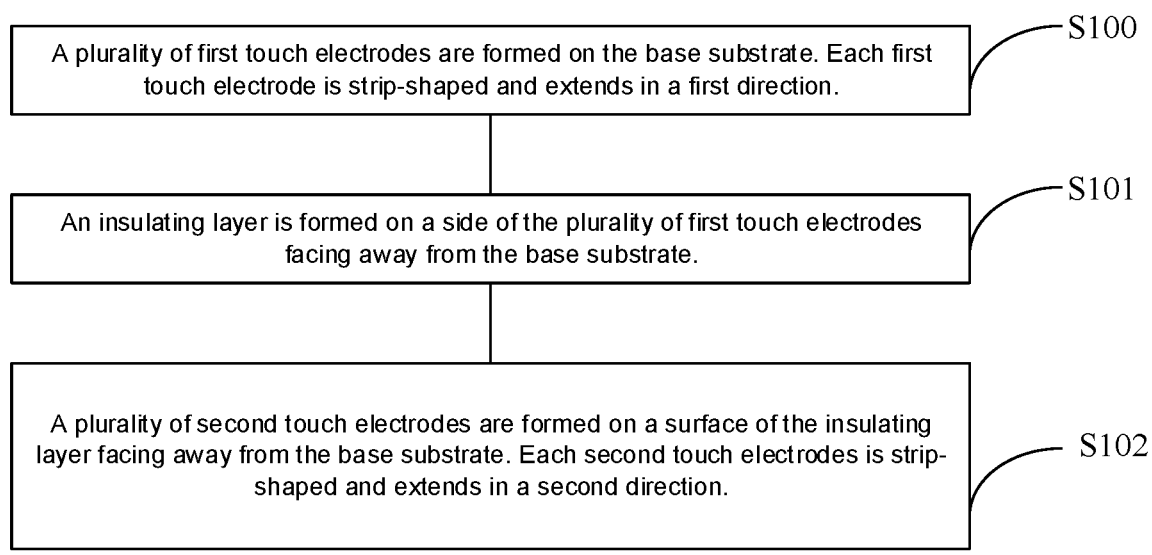
FIG. 17 is a flow diagram of a method of manufacturing a touch substrate, in accordance with some embodiments of the present disclosure.

Some embodiments of the present disclosure provide a touch display device 01. Referring to FIG. 16, the touch display device 01 includes the touch panel 001 described above. The touch display device 01 also has the advantage of improving the signal transmission speed of the touch display device while ensuring the display effect of the touch display device.

For example, referring to FIG. 16, the touch display device 01 further includes a display panel 002 disposed on the touch panel 001.

Some embodiments of the present disclosure provide a method of manufacturing a touch substrate. Referring to FIGS. 5, 6A, 6B, 7 and 17, the method includes the following steps.

In S100, a plurality of first touch electrodes 1 are formed on the base substrate 10. Each first touch electrode 1 is strip-shaped and extends in a first direction OX.

As shown in FIG. 6A, each first touch electrode 1 and each second touch electrode 1 each include a mesh structure 30 and a plurality of preset patterns 40. Each mesh structure 30 has a plurality of meshes 301. Each mesh 301 is provided with at least one preset pattern 40 therein, and each preset pattern 40 is electrically insulated from a mesh 301 in which it is located.

Here, processes of forming the first touch electrodes 1 are not limited. In some embodiments, a first conductive film is first formed on the base substrate 10, and then the first conductive film is patterned to form the plurality of first touch electrodes 1. For example, the patterning process includes processes such as coating a photoresist, exposure, development, etching and cleaning.

In addition, before the plurality of first touch electrodes 1 are formed, film layers that have been formed on the base substrate 10 are not limited. For example, a black matrix (BM) pattern is formed on the base substrate 10 before the plurality of first touch electrodes 1 are formed.

In another example, before the plurality of first touch electrodes 1 are formed, a first over coat (abbreviated as OC) layer is first formed on the base substrate 10, and then the plurality of first touch electrodes 1 are formed on a surface of the first over coat layer facing away from the base substrate 10. Here, in a process of forming the plurality of first touch electrodes 1, the first over coat layer may serve to protect the base substrate 10.

In S101, an insulating layer 3 is formed on a side of the plurality of first touch electrodes 1 facing away from the base substrate.

Here, a material of the insulating layer 3 is not limited. For example, the material of the insulating layer 3 includes at least one of silicon nitride, silicon oxide or silicon oxynitride.

In S102, a plurality of second touch electrodes 2 are formed on a surface of the insulating layer 3 facing away from the base substrate. Each second touch electrodes 2 is strip-shaped and extends in a second direction OY.

As shown in FIG. 6B, each second touch electrodes 2 includes a mesh structure 30 and a plurality of preset patterns 40. Each mesh structure 30 has a plurality of meshes 301. Each mesh 301 is provided with at least one preset pattern 40 therein, and each preset pattern 40 is electrically insulated from a mesh 301 in which it is located.

Here, processes of forming the second touch electrodes 2 are not limited. For example, a second conductive film is first formed on the insulating layer, and then the second conductive film is patterned to form the plurality of second touch electrodes 2. For example, the patterning process includes the processes such as coating the photoresist, exposure, development, etching and cleaning.

Orthographic projections of the plurality of first touch electrodes 1 on the base substrate 10 intersect with orthographic projections of the plurality of second touch electrodes 2 on the base substrate 10 to form a plurality of intersection regions A. In each intersection region A, orthographic projections of a mesh structure 30 and a plurality of preset patterns 40 of the first touch electrode 1 on the base substrate 10 and orthographic projections of a mesh structure 30 and a plurality of preset patterns 40 of the second touch electrode 2 on the base substrate 10 form a projected mesh structure, and the projected mesh structure has a plurality of projected meshes 302 having the same shape and size.

It will be noted that the number of the at least one preset pattern 40 disposed in each mesh 301 of each mesh structure 30 is not limited. For example, as shown in FIGS. 6A and 6B, each mesh 301 is provided with a single preset pattern 40 therein. As another example, as shown in FIGS. 12A and 12B, each mesh 301 is provided with at least two preset patterns 40 therein.

The method of manufacturing the touch substrate described above also has the advantage of improving the signal transmission speed of the touch display device while ensuring the display effect.

In some embodiments, after the step S102, the method of manufacturing the touch substrate described above further includes forming a second over coat layer on a side of the plurality of second touch electrodes 2 facing away from the base substrate 10.

The foregoing descriptions are merely some implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A touch substrate, comprising:
   a base substrate; and
   a plurality of first touch electrodes and a plurality of second touch electrodes disposed on the base substrate, wherein at least one first touch electrode of the plurality of first touch electrodes is strip-shaped and extends in a first direction, at least one second touch electrode of the plurality of second touch electrodes is strip-shaped and extends in a second direction, and the plurality of first touch electrodes are disposed in a different layer from and electrically insulated from the plurality of second touch electrodes, wherein
   the at least one first touch electrode and the at least one second touch electrode each include a mesh structure and a plurality of preset patterns, and the mesh structure includes a plurality of meshes; at least one of the plurality of meshes is provided with at least one of the plurality of preset patterns therein, and at least one of the plurality of preset patterns is electrically insulated from a mesh in which it is located; and
   at least one orthographic projection of the at least one first touch electrode on the base substrate is disposed crosswise to at least one orthographic projection of the at least one second touch electrode on the base substrate to form at least one intersection region; and in at least one intersection region, orthographic projections of a mesh structure and a plurality of preset patterns of a corresponding first touch electrode on the base substrate and orthographic projections of a mesh structure and a plurality of preset patterns of a corresponding second touch electrode on the base substrate form a projected mesh structure, and the projected mesh structure has a plurality of projected meshes;
   the plurality of projected meshes have a same shape and size;
   each preset pattern has a same shape as the mesh in which it is located, and a center of the preset pattern coincides with a center of the mesh in which it is located, and sides of the preset pattern are parallel to corresponding sides of the mesh in which it is located, respectively; and
   in at least one intersection region, an orthographic projection of a center of each preset pattern of a corresponding first touch electrode coincides with an orthographic projection of a mesh node of a mesh structure of a corresponding second touch electrode, and an orthographic projection of a center of each preset pattern of the corresponding second touch electrode coincides with an orthographic projection of a mesh node of a mesh structure of the corresponding first touch electrode.

2. The touch substrate according to claim 1, wherein at least one of the plurality of preset patterns has a shape of a parallelogram or a regular hexagon.

3. The touch substrate according to claim 2, wherein each preset pattern has a diamond shape.

4. The touch substrate according to claim 1, wherein each mesh is provided with a single preset pattern therein, and a length of each side of the preset pattern is equal to half of a length of a corresponding side of the mesh in which the preset pattern is located.

5. The touch substrate according to claim 1, wherein each mesh is provided with N preset patterns having different sizes therein, and N is an integer greater than or equal to two;
in a direction that a center of the mesh perpendicularly points to a side of the mesh, the N preset patterns are concentrically arranged in a sequence from small to large, and are a first preset pattern to an Nth preset pattern in turn; and
in the N preset patterns, a ratio of a length of each side of an i-th preset pattern to a length of a corresponding side in the mesh in which the i-th preset pattern is located is $$\frac{i}{N+1},$$

and i takes any value from one to N.

6. The touch substrate according to claim 1, wherein the mesh structure and the plurality of preset patterns are made of a same conductive material.

7. The touch substrate according to claim 1, wherein a material of the mesh structure includes at least one of Cu, Ag, Al, Ti or Ni; and
a material of the plurality of preset patterns includes at least one of Cu, Ag, Al, Ti, or Ni.

8. The touch substrate according to claim 1, wherein the plurality of first touch electrodes are a plurality of driving electrodes, and the plurality of second touch electrodes are a plurality of sensing electrodes; or,
the plurality of first touch electrodes are a plurality of sensing electrodes, and the plurality of second touch electrodes are a plurality of driving electrodes.

9. A touch panel, comprising the touch substrate according to claim 1.

10. A touch display device, comprising the touch substrate according to claim 1.

* * * * *